3,180,847
POLYMERIC ORGANOPHOSPHONITE STABILIZED HALOGEN-CONTAINING VINYL RESIN SOLUTIONS
George W. Fowler, South Charleston, and Solomon P. Hersh and Andrew T. Walter, Charleston, W. Va., assignors to Union Carbide Corporation, a corporation of New York
No Drawing. Filed Nov. 21, 1960, Ser. No. 70,447
8 Claims. (Cl. 260—32.8)

The present invention relates to solutions of halogen-containing vinyl resins, and more particularly, to the production of stabilized solutions of halogen-containing vinyl resins which demonstrate an improved resistance to the development of color upon heating.

Halogen-containing vinyl resins are well known to the art and find use in a number of diverse applications. Noteworthy among these users is the role such resins play in the production of synthetic fibers. It is also known that compositions prepared from halogen-containing vinyl resins are sensitive to heat and light as manifested by discoloration. Thus, for example, in the conventional production or spinning of shaped articles such as fibers from halogen-containing vinyl resins, it is usually necessary to dissolve the resin in a suitable organic solvent by means of heat and to maintain the solution at an elevated temperature for a prolonged period of time, during which the heated resin solution is extruded into either heated air or into a heated liquid coagulating bath. Unfortunately, during these and/or other operations involving the heating of halogen-containing vinyl resin solutions, the color of the resin solution generally undergoes a progressive yellowing or darkening, which in turn, undesirably affects the color of the articles ultimately produced therefrom. Since a high degree of initial "whiteness" is generally desired for synthetic fibers, and since the initial color of the fibers is dependent in no small part upon the color of the resin solutions from which they are spun, the color developed as a consequence of heating may be sufficient to restrict many potential uses for the products. Consequently, it is customary to incorporate small amounts of stabilizing materials in halogen-containing vinyl resin solutions for the purpose of retarding or inhibiting discoloration.

Heretofore, a considerable number of compounds designed to function as stabilizers for halogen-containing vinyl resins have been proposed, as for instance, lead and calcium salts of the higher fatty acids, the alcoholates of alkaline earth metals, various organophosphites such as mono- and dialkyl phosphites, tri-(2-chloroethyl) phosphite, di- and triaryl phosphites, etc., various organotin compounds, such as dioctyltin maleate, dibutyltin dilaurate, etc., and the like. However, many of these compounds have not been found entirely satisfactory in minimizing the discoloration of halogen-containing vinyl resin compositions upon prolonged exposure to heat. Moreover, it has been found that the suggested use of many of the aforementioned compounds as stabilizers for halogen-containing vinyl resins when in a solid environment, e.g., milled sheets, fibers and the like, fails to predict their similar effectiveness when the resin is in solution.

Through the practice of the present invention, one or more of the following objects can now be achieved, thus overcoming many disadvantages of the prior art as hereinabove described.

It is an object of this invention to provide halogen-containing vinyl resin solutions which show improved resistance to discoloration upon exposure to heat. It is another object of this invention to provide improved stabilizing materials for increasing the resistance of halogen-containing vinyl resin solution to discoloration upon exposure to heat. A further object of this invention is to provide a novel method for retarding or inhibiting the discoloration of halogen-containing vinyl resin solutions upon exposure to heat. Still other objects of this invention will become apparent in light of the following description.

The present invention is concerned broadly with the stabilization of solutions of those halogen-containing vinyl resins of the type prepared by the conjoint polymerization of vinyl chloride or vinylidene chloride, or both, with acrylonitrile. Within the broad class of these resins, conjointly polymerized vinyl chloride or vinylidene chloride, or both, with acrylonitrile, containing in the resin from about 15 percent to about 70 percent by weight of the polymerized chlorine-containing monomer, have been found especially susceptible to stabilization by the materials hereinafter described. More particularly, the resin solutions contemplated by this invention are those in which, as the resin is dissolved in a suitable inert organic solvent, such as acetonitrile, acetone, the N,N-dialkyl formamides and acetamides, ethylene carbonate, cyclohexanone, etc., or any other inert organic solvent for the resin which will not react with the stabilizer employed or the resin itself. Such solutions, for example, include those which currently find common usage as spinning "dopes" in the production of synthetic fibers, although it is to be noted, the invention is in no way limited thereto.

The invention is based upon the discovery that certain polymeric organophosphonites serve as especially efficient heat stabilizers for solutions of halogen-containing vinyl resins. In particular, the polymeric organophosphonites contemplated as stabilizers by this invention are the polymeric products produced by the reaction of a saturated aliphatic polyol containing from 2 to about 8 carbon atoms, especially a saturated aliphatic diol, with a diorgano phenylphosphonite having a structure corresponding to the general formula

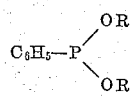

wherein R designates either an alkyl radical containing from 1 to about 10 carbon atoms or a phenyl radical. During the course of the reaction, an alkyl alcohol and/or a phenol is also produced depending upon the particular diorgano phenylphosphonite utilized as a reactant. Hence, the reaction temperature employed in the production of the polymeric organophosphonite stabilizers contemplated by this invention is ordinarily and preferably sufficiently high so as to facilitate the liberation and removal of the alcohol formed during the course of the reaction. In this manner, optimum product yields can ultimately be realized.

The actual identity of the polymeric products produced as herein described will depend for the most part upon the ratio in which the reactants are employed. Thus, for example, upon the utilization of the diorgano phenylphosphonite in a substantial excess over an equimolar proportion with respect to the preferred polyol reactant, i.e., a saturated aliphatic diol, especially in proportions of greater than 2 up to about 4 or more moles of the phosphonite per mole of the diol, the polymeric product obtained is predominantly the dimer having a structure corresponding to the general formula

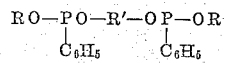

wherein R is as defined above and R' designates a divalent radical residue derived from the diol reactant and which is otherwise identical in structure therewith save for the exclusion of the hydroxyl radicals of the diol. Such a product, it can be seen, is produced by a reaction involving only one of the ester groups, i.e., —OR groups, of each molecule of the phosphonite reactant, and entails the evolution of the corresponding alcohol ROH, wherein R is as defined above. Alternatively, when the reactants are employed in more nearly equimolar proportions, e.g., in a proportion of less than about 2 moles of the phosphite per mole of the diol, or when the diol is utilized in an excess over an equimolar proportion with respect to the phosphonite, the predominant product that is obtained is the more viscous liquid linear polymer having a structure corresponding to the general formula

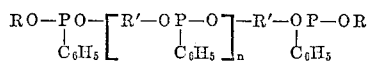

wherein R and R' are as defined above and n is an integer having a value of from 1 to about 8 or even higher. Such a product is produced by the reaction of both ester groups of each molecule of the diorgano phenylphosphonite reactant with the exception of the chain-terminating phosphonite molecules, of which only one ester group undergoes reaction. Thus, while efficient polymeric organophosphonite stabilizers are obtained in accordance with this invention by employing the reactants in a phosphonite to diol ratio of from 0.1 mole to about 5 moles of the phosphonite, and preferably from about 0.3 mole to about 2 moles of the phosphonite per hydroxyl radical present in the diol reactant, proportions outside this range can also be employed, albeit the efficiency of the reaction may thereby be reduced. Similar considerations hold true when other polyols are employed as reactants instead of the diols used above for illustrative purposes.

Moreover, it is to be noted that in any given reaction between a diorgano phenylphosphonite and, for example, a saturated aliphatic diol, both the dimer and the higher molecular weight polymers described above may be obtained as products, and that each are highly effective as heat stabilizers for halogen-containing vinyl resin solutions. The dimer and the higher molecular weight polymers can, if desired, be mutually separated subsequent to their production by conventional techniques, such as by the fractional distillation of the crude reaction product or by any other convenient method. However, their mutual separation is in no way essential to their use as stabilizers in accordance with this invention.

As typical of the diorgano phenylphosphonites contemplated as reactants in accordance with this invention there can be mentioned the following: diethyl phenylphosphonite, di-n-butyl phenylphosphonite, diisobutyl phenylphosphonite, dihexyl phenylphosphonite, di-2-ethylhexyl phenylphosphonite, diisooctyl phenylphosphonite, didodecyl phenylphosphonite, diphenyl phenylphosphonite, and the like. Of these, the use as a reactant of a dialkyl phenylphosphonite possessing alkyl radicals containing from 2 to about 8 carbon atoms is preferred. It is also to be noted that the diorgano phenylphosphonite reactant can contain more than one type of ester grouping. Thus, other suitable diorgano phenylphosphonite reactants include butyl phenyl phenylphosphonite, ethyl hexyl phenylphosphonite, and the like. Hence, for example, when a mixed dialkyl phenylphosphonite is employed as a reactant, the ester grouping of the compound which is the most susceptible to transesterification, and therefore the first to react with the polyol reactant, is the —OR radical corresponding to the lowest boiling alcohol of the formula ROH.

The saturated aliphatic polyols contemplated as reactants in accordance with this invention include the saturated aliphatic diols, such as ethylene glycol, propylene glycol, 1,2-butanediol, 1,4-butanediol, 1,5-pentanediol, 1,8-octanediol, and the like. Also contemplated by the expressions "saturated aliphatic polyols" and "saturated aliphatic diols" as employed herein and in the appended claims are the saturated aliphatic glycol ethers, e.g., the di-, tri-, and polyoxyalkylene glycols, such as diethylene glycol, triethylene glycol, dipropylene glycol, etc. In addition, stabilizers for halogen-containing vinyl resin solutions can also be obtained by the reaction of a diorgano phenylphosphonite with other polyols such as the tri- and polyhydric saturated aliphatic alcohols including 1,2,6-hexanetriol, pentaerythritol, and the like. The polyols preferred as reactants are those containing from 4 to about 6 carbon atoms. It is also preferred that the hydroxyl radicals of the polyols be separated by at least 4 carbon atoms since the possible formation of cyclic products is thereby obviated.

In order to facilitate the removal of the alcohol ROH formed during the course of the reaction, the polyol employed as a reactant is ordinarily and preferably one having a boiling point above that of the alcohol ROH. Thus, it can also be seen that the diorgano phenylphosphonite employed as a reactant ordinarily and preferably contains at least one ester, i.e. —OR, grouping corresponding to an alcohol having the formula ROH which is lower boiling than the polyol reactant. In this manner, the removal of the alcohol ROH during the course of the reaction can be effected readily by conducting the reaction at a temperature which is at or above the boiling point of the alcohol while below the boiling point of the polyol reactant, and by distilling off the alcohol as it is formed. Accordingly, by way of illustration, the reaction between diethyl phenylphosphonite and 1,8-octanediol can be conducted at any temperature between 78.4° C. under atmospheric pressure, the boiling point of ethanol, and 180° C. under a reduced pressure of 15 millimeters of mercury the boiling point of the diol reactant. In addition, an azeotroping agent, such as benzene or toluene, etc. can also be incorporated in the reaction mixture to assist in the removal of alcohol. Moreover, when a lower boiling azeotrope is formed between such an agent and the alcohol ROH, the reaction can be conducted at any temperature at which such azeotrope is recoverable as a distillate, notwithstanding the fact that this temperature may be somewhat below the boiling point of the alcohol per se.

Conducted in the manner, the reaction is preferably allowed to proceed to completion as evidenced by a cessation in the evolution and recovery of the alcohol ROH. Shorter reaction periods can also be employed, although generally accompanied by reduced product yields. The crude reaction product is then ordinarily stripped to remove any unreacted material or alcohol, as well as any azeotroping agent present. To this end, good results can be obtained, for example, by stripping the crude reaction product up to about the boiling point of the polyol reactant. The polymeric organophosphonite product thus obtained as a residue is thereafter utilizable as a stabilizer for halogen-containing vinyl resin solutions as herein described.

When incorporated in halogen-containing vinyl resin solutions, the polymeric organophosphonites contemplated as stabilizers by this invention are effective in substantially preventing the discoloration of the resin solutions upon exposure to heat. In this manner, for example, the discoloration of fiber-spinning solutions can be minimized during spinning operations. In addition, synthetic fibers can be obtained from these solutions having a high degree of initial "whiteness," i.e., low color. Further, due to their higher molecular weight, as compared with conventional phosphorous-containing compounds, the polymeric organophosphonites advantageously exhibit lower volatility and are often characterized by less odor. Moreover, the solubility of the polymeric organophosphonites in conventional solvents such as acetonitrile, acetone, N,N-dimethylformamide, etc., also facilitates the spinning operation and avoids the necessity of working with a two-phase spinning solution.

The polymeric organophosphonites produced as herein-described have been found effective as stabilizers when incorporated in halogen-containing vinyl resin solutions in small amounts effecting concentrations in the resin solutions of from about 0.01 percent to about 2 percent by weight of phosphorous based upon the weight of the resin.

The concentration of stabilizer to be employed is therefore dependent upon the molecular weight of the particular compound utilized. Especially good results have been obtained in this connection by incorporating the polymeric organophosphonite in the halogen-containing vinyl resin solution in amounts effecting concentrations of from about 0.05 percent to about 1 percent by weight of phosphorus based upon the weight of the resin. Little increase in the resistance of the resin solutions to discoloration by heat is realized by the use of stabilizer concentrations above this preferred range, although the use of such higher concentrations often permits the maintenance of a desirable degree of resistance to discoloration for longer periods of time, and may therefore be expedient where prolonged heating periods are involved. On the other hand, the stability of the resin solutions decreases proportionally with decreasing stabilizer concentrations below this range.

The method of incorporating the polymeric organophosphonite compounds in the halogen-containing vinyl resin solution to be stabilized is not critical to this invention. Hence, any convenient method can be employed. For example, while the stabilizer is preferably added to the resin solvent prior to the addition of resin, the stabilizer can also be added to the solution during or following the dissolution of the resin in the solvent.

The utility and advantages of the polymeric organophosphonite stabilizers described herein, as well as of the resin solutions stabilized therewith, will become further apparent from the following examples included to illustrate the practice of this invention.

EXAMPLE I

In a kettle equipped with a stirrer, thermometer and a packed reflux column, 264 grams of diethyl phenylphosphonite (1.33 moles) and 139 grams of 1,5-pentanediol (1.33 moles) were reacted in initial admixture with 500 cubic centimeters of toluene, at a temperature which was gradually raised to 150°, while removing the ethanol formed during the course of the reaction as an azeotropic distillate with toluene. The reaction was continued until the evolution of ethanol virtually ceased. Thereafter, the crude reaction product was vacuum-stripped up to a temperature of 170° C., under a reduced pressure of 4 millimeters of mercury. In this manner, 296 grams comprised of a polymeric diethyl phenylphosphonite-1,5-pentanediol reaction product were recovered as a water-white liquid remaining behind in the kettle. Analysis showed the product to have a phosphorous content of 14.36 percent by weight and a viscosity of 9,500 centipoises at a temperature of 25° C. The product was found to be an effective stabilizer for halogen-containing vinyl resin solutions.

In similar manner, an effective stabilizer for halogen-containing vinyl resin solutions is obtained by reacting dibutyl phenylphosphonite with diethylene glycol.

EXAMPLE II

Using equipment similar to that described in Example I, 248 grams of diphenyl phenylphosphonite (0.84 mole) and 88 grams of 1,5-pentanediol (0.84 mole) were reacted at temperature maintained in the range of from about 90° C. to about 175° C., under a reduced pressure of from 3 millimeters to 10 millimeters of mercury, for a period of one and one-half hours. During the reaction, nitrogen was continuously bubbled through the reaction mixture. Upon the completion of the reaction period, the system was purged with nitrogen at a temperature of 175° C., under a reduced pressure of 20 millimeters of mercury, to remove any trace of phenol present. In this manner, 185 grams comprised of a polymeric diphenyl phenylphosphonite-1,5-pentanediol reaction product were recovered as a light yellow liquid remaining behind in the kettle. Analysis showed the product to have a phosphorus content of 13.87 percent by weight and a viscosity of 5,900 centipoises at a temperature of 25° C. The product was found to be an effective stabilizer for halogen-containing vinyl resin solutions.

In a similar manner, an effective stabilizer for halogen-containing vinyl resin solutions is obtained by reacting diphenyl phenylphosphonite with 1,2,6-hexanetriol.

EXAMPLE III

A series of experiments were conducted in the following manner to demonstrate the stabilizing action on halogen-containing vinyl resin solutions of various polymeric organophosphonites as provided for by this invention. In each experiment, 150 grams of acetone were introduced to a one-pint pressure bottle and cooled by placing the bottle in an acetone "Dry Ice" bath for about 30 minutes or until the temperature of the acetone reached approximately −20° C. One gram of the particular stabilizer utilized in each experiment was subsequently dissolved in the actone, and to this cool solution, 50 grams of a copolymer of vinyl chloride (60 percent) and acrylonitrile (40 percent), having a molecular weight such that the specific viscosity of an 0.2 percent solution of the resin in cyclohexanone at a temperature of 20° C. was 0.261, were then added. The bottle containing the solvent, stabilizer and resin was capped, enclosed in a protective fabric bag and placed in a tumbling water bath at a temperature of 50° C. for about 30 minutes to effect solvation of the resin. Heating was continued for two hours at a temperature of 80° C., whereby a clear resin solution was obtained containing 25 percent solids and suitable for the spinning of synthetic fibers. The color of the resin solution was then determined quantitatively by measuring the transmission of light at a wave length of 430 millimicrons through a N,N-dimethylformamide solution containing 4 percent resin and 12 percent acetone by weight, and prepared by weighing out approximately 5 grams of the resin solution into a two-ounce glass vial and adding thereto a volume of N,N-dimethylformamide which in cubic centimeters was equal to 5.3 times the weight of the resin solution in grams.

The results obtained from these experiments are tabulated below in Table A. Included in the table for comparison are results obtained from similar experiments, in which, however, phosphorus-containing stabilizers other than those included within the scope of this invention, such as, tri-(2-chloroethyl) phosphite, dibutyl phosphite, di-(2-ethylhexyl) phosphite, diphenyl phosphite, diisopropyl phosphite, 2-ethylhexyl octylphenyl phosphite and triphenyl phosphite, were employed. Also included in the table are results obtained from control samples containing unstabilized resin solutions. One such control was prepared as described above but was not subjected to heat treatment. In the table, "color values" represent the percent transmission of light at a wave length of 430 millimicrons through the resin solution, with high "color values" being preferred. In all instances, the "color values" for the stabilized resin solution were measured after heat treatment.

*Table A*

| Stabilizer: | Color values |
|---|---|
| Controls— | |
|     None (unheated resin solution) | 87 |
|     None (heated resin solution) | 63 |
| Polymeric organophosphonites— | |
|     Residue product of Example No. 1 | 84 |
|     Residue product of Example No. 2 | 85 |
| Other stabilizers— | |
|     Tri-(2-chloroethyl) phosphite | 69 |
|     Dibutyl phosphite | 67 |
|     Di-(2-ethylhexyl) phosphite | 66 |
|     Diphenyl phosphite | 65 |
|     Diisopropyl phosphite | 66 |
|     2-ethylhexyl octylphenyl phosphite | 70 |
|     Triphenyl phosphite | 69 |

From the above table, the improved resistance to discoloration upon heating that is obtained by incorporating the stabilizers of this invention in a halogen-containing vinyl resin solution is readily apparent. In this connection, it is to be noted that those resin solutions having lower resistance to discoloration possess lower "color values," the latter signifying the transmission of less light through the solutions as a result of increased color development during heat treatment.

The invention is susceptible of further modification within the scope of the appended claims.

What is claimed is:

1. A stabilized halogen-containing vinyl resin solution, comprising an organic solvent solution of a resin copolymer of acrylonitrile with at least one member selected from the group consisting of vinyl chloride and vinylidene chloride, said copolymer containing from about 15 percent to about 70 percent by weight of the chlorine-containing monomer, and a stabilizing amount of the polymeric organophosphonite produced by the reaction of a saturated aliphatic polyol containing from 2 to 8 carbon atoms with a diorgano phenylphosphonite represented by the general formula

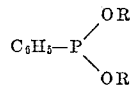

wherein R designates a member selected from the group consisting of the alkyl radicals containing from 1 to about 10 carbon atoms and the phenyl radical, at a temperature between the boiling point of the lowest boiling alcohol formed during the course of the reaction and the higher boiling point of said saturated aliphatic polyol, in a proportion of from about 0.1 mole to about 5 moles of said diorgano phenylphosphonite per hydroxyl radical present in said saturated aliphatic polyol, while removing the alcohol formed during the course of the reaction.

2. A stabilized halogen-containing vinyl resin solution, comprising an organic solvent solution of a resin copolymer of acrylonitrile with at least one member selected from the group consisting of vinyl chloride and vinylidene chloride, said copolymer containing from about 15 percent to about 70 percent by weight of the chlorine-containing monomer, and a stabilizing amount of the polymeric organophosphonite produced by the reaction of a saturated aliphatic diol containing from 4 to 6 carbon atoms, in which the hydroxyl radicals are separated by at least 4 carbon atoms, with a diorgano phenylphosphonite represented by the general formula

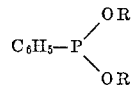

wherein R designates a member selected from the group consisting of the alkyl radicals containing from 2 to 8 carbon atoms and the phenyl radical, at a temperature between the boiling point of the lowest boiling alcohol formed during the course of the reaction and the higher boiling point of said saturated aliphatic diol, in a proportion of from about 0.3 mole to about 2 moles of said diorgano phenylphosphonite per hydroxyl radical present in said saturated aliphatic diol, while removing the alcohol formed during the course of the reaction.

3. The stabilized halogen-containing vinyl resin solution according to claim 2 wherein the diorgano phenylphosphonite employed in producing the polymeric organophosphonite is diethyl phenylphosphonite.

4. The stabilized halogen-containing vinyl resin solution according to claim 2 wherein the diorgano phenylphosphonite employed in producing the polymeric organophosphonite is diphenyl phenylphosphonite.

5. The stabilized halogen-containing vinyl resin solution according to claim 2 wherein the saturated aliphatic diol employed in producing the polymeric organophosphonite is 1,5-pentanediol.

6. The stabilized halogen-containing vinyl resin solution according to claim 1 wherein the polymeric organophosphonite is incorporated in the vinyl resin solution in a concentration effecting the presence of from about 0.01 percent to about 2 percent by weight of phosphorus based upon the weight of the resin.

7. The stabilized halogen-containing vinyl resin solution according to claim 2 wherein the polymeric organophosphonite is incorporated in the vinyl resin solution in a concentration effecting the presence of from about 0.01 percent to about 2 percent by weight of phosphorus based upon the weight of the resin.

8. The stabilized halogen-containing vinyl resin solution according to claim 2 wherein the polymeric organophosphonite is incorporated in the vinyl resin solution in a concentration effecting the presence of from about 0.05 percent to about 1 percent by weight of phosphorus based upon the weight of the resin.

References Cited by the Examiner
UNITED STATES PATENTS

| | | | |
|---|---|---|---|
| 2,516,980 | 8/50 | Gray | 260—45.7 |
| 2,726,256 | 12/55 | Morris et al. | 260—461.303 |
| 2,847,443 | 8/58 | Hechenbleikner | 260—461.303 |
| 2,856,369 | 10/58 | Smith et al. | 260—45.7 |
| 2,878,227 | 3/59 | Ucci et al. | 260—45.7 |
| 2,946,764 | 7/60 | Toy et al. | 260—45.7 |
| 3,050,499 | 8/62 | Gordon et al. | 260—45.7 |
| 3,056,824 | 10/62 | Hecker et al. | 260—45.7 |
| 3,061,583 | 10/62 | Huhn et al. | 260—45.7 |

FOREIGN PATENTS 743,922   1/56   Great Britain.

ALEXANDER H. BRODMERKEL, Primary Examiner.

DANIEL ARNOLD, LESLIE H. GASTON, Examiners.